Oct. 11, 1960
E. A. MALICK
2,955,419
FLAME HOLDER DEVICE
Filed Dec. 10, 1951
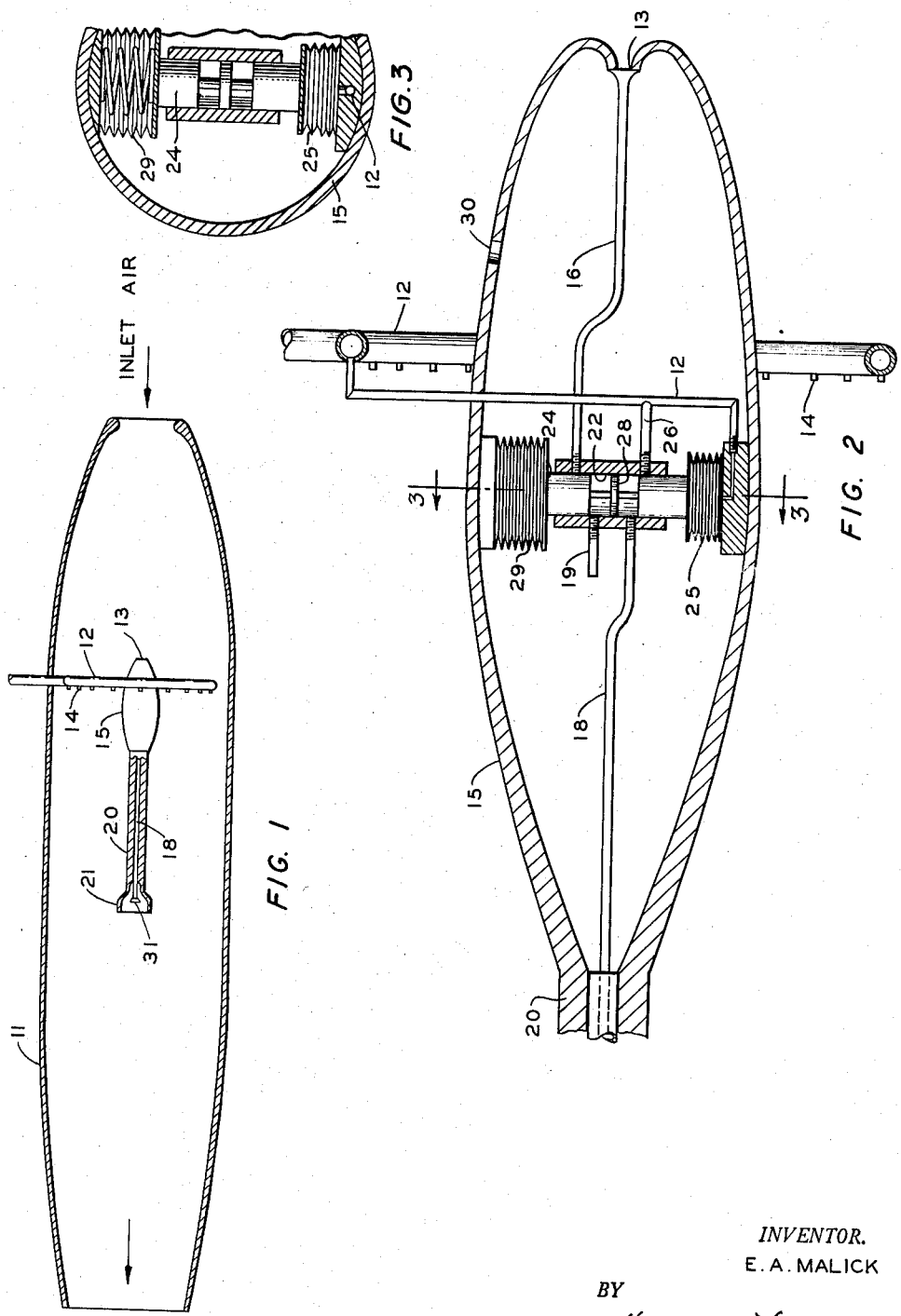
INVENTOR.
E. A. MALICK
BY
Hudson & Young
ATTORNEYS United States Patent Office 2,955,419
Patented Oct. 11, 1960

2,955,419

FLAME HOLDER DEVICE

Emil A. Malick, Bartlesville, Okla., assignor to Phillips Petroleum Company, a corporation of Delaware Filed Dec. 10, 1951, Ser. No. 260,888

11 Claims. (Cl. 60—39.03)

This invention relates to burners and particularly to burners wherein a fuel such as a gaseous or liquid or powdered fuel is injected into and burned in a moving column of a combustion-supporting gas such as air. In one specific aspect this invention relates to continuous combustion devices, particularly some forms of jet engines, afterburners, gas turbines and similar devices. In another of its more specific aspects this invention relates to the operation of continuous flow combustion devices. In still another of its more specific aspects this invention relates to the operation of jet engines.

Gas turbines have been employed in industry for some time. Jet engines have only in the last few years been used in large numbers for the purpose of propelling aircraft and they have been found to be highly advantageous for use in high speed planes. With the increase in use of these engines however, a multitude of operational problems has also come to be recognized.

Continuous combustion devices such as gas turbines and jet engines, with which this invention is concerned, comprise substantially four parts;

(1) An air intake section;
(2) A compression section;
(3) A fuel addition and combustion section;
(4) An exhaust or thrust producing section.

The air intake section including means for effecting such air intake can roughly be divided into three types, viz. the types found in a ram jet, a pulse jet and an engine employing a rotating compressor, such as a turbo compressor operated by a gas turbine as motivating power for introducing air into the combustion section. These different types of air intake systems though substantially different in mechanical form all serve the same function, namely to provide the necessary air supply to the fuel addition or combustion section.

The combustion section including the fuel supply or injection system and the exhaust section are somewhat similar for each of the above-indicated types of engines. The operation of many of these engine types is similar, namely, to burn the fuel and utilize as much as possible of the heat energy generated to produce thrust for the engine. The major types of combustion and exhaust sections are exemplified by comparing the ram jet or pulse jet engine types to the gas turbine engine type. In the turbo jet engine the combustion gases pass through a turbine which utilizes part of the heat energy of the combustinon gases to drive an air compressor to compress and to supply air to the combustion zone. The gases are then exhausted to the atmosphere through the exhaust section or tail pipe resulting in the production of thrust. In the cases of the ram jet and pulse jet engines the hot gases pass directly from the combustion section to the exhaust or tail pipe section and it is thus more difficult to establish a clear line of demarcation between these zones.

Some of the problems which are encountered in the operation of jet engines may be exemplified by those encountered in the operation of a turbo-jet engine. Performance of a jet engine is dependent upon "temperature rise" or increase in temperature between the inlet to the combustor (combustion zone) and the exhaust outlet. During the initial combustion in the "primary" zone of the combustor it is desirable to supply fuel and air in such proportions as to approach stoichiometric fuel-air ratios. An excess of air is subsequently introduced in order to dilute the resulting combustion gases and thereby to reduce the temperature of the gases contacting the turbine blades. The temperature rise must be carefully controlled since the operation of a turbo-jet engine is limited by the ability of the turbine blades to withstand high temperatures.

For each engine speed at a given altitude, a certain temperature rise is required for the operation of any given jet engine. Also for each combination of combustor inlet pressure and mass air flow there exists for any given fuel a maximum temperature rise which is related to the combustion stability performance of that fuel under the combination of these conditions. As the operating conditions become more serve a condition of decreased combustion stability will generally be approached. For example "Cycling" is an indication of combustion instability. The flame front within the combustion zone tends to fluctuate back and forth and in severe cases the flame may be extinguished. The point at which combustion will no longer be sustained is known as the "blow-out" or "cut-out" point. Rich mixture blow-out is occasionally the primary characteristic controlling maximum thrust output of a turbo-jet engine at a given altitude. Lean mixture blow-out may result at very low fuel flow when the flow of fuel to the burner is suddenly reduced to reduce engine speed. This results in a smaller flame at the burners in the combustion zone. Under these conditions the velocity of the incoming air may be so high as to tend to blow-out the flame or cause erratic operation. Under extreme conditions the burner flame may fail and necessitate reignition under unusually adverse conditions. Similar operational problems are encountered in ram jet engines.

The combustion section or combustion chamber design is difficult, particularly in turbo-jet and ram jet engines as well as in gas turbines. For example in a ram jet engine an extremely large quantity of fuel must be burned efficiently in a small space without excessive pressure drop. At some point in the combustion chamber, ignition of the fuel and air mixture must occur. At the point of ignition there must be very low air-flow velocity, generally much lower than the velocity at the air intake entrance. Here again as in the turbo-jet engine there are two important limiting mixture ratios, lean mixture blow-out limit and rich mixture blow-out limit. As indicated hereinbefore flame blow out at low thrust or power output represents partial or complete cessation of combustion and is defined as low blow-out or lean mixture blow-out. It is encountered when the combustor or burner is unable to maintain steady combustion as the fuel flow is decreased. On the other hand if the fuel-air ratio is richer or greater than the rich mixture blow-out limit, combustion cannot be maintained or initiated. Attention must therefore be given in the design of a combustion chamber and particularly to the problem of securing stable combustion over a wide range of operating conditions.

An object of this invention is to provide an improved method and an apparatus useful for operating continuous combustion devices such as gas turbines, and the various types of jet engines. Another object of this invention is to provide an improved method for operating turbo-jet engines. Another object is to provide an improved method for operating ram jet engines. Another object of this invention is to provide a device for extending the operational limits of jet engines. Another object of the present invention is to provide a mechanism for regulating fuel and air supply to a flame holder to provide stable combustion under varying operating conditions.

The foregoing and other objects and advantages will become apparent in view of the accompanying description taken in conjunction with the accompanying drawings wherein. Fig. 1 is a schematic representation of a ram jet showing the essential operating portions thereof, their relative positions and a typical manner of employing this invention; Fig. 2 is a schematic representation of an automatically controlled flame holding mechanism of this invention; and Fig. 3 is a section view taken on the line 3—3 of Figure 2.

Referring now as to the drawings in detail and first to Fig. 1, an outer shell or housing is generally indicated at 11. This shell is adapted to receive an air supply in the forward inlet portion thereof, due to the forward movement of the engine itself or the device in which the engine may be installed. Shell 11 is also adapted for or provided with an exhaust or thrust producing outlet in the rear thereof. Located intermediate of the air inlet and the exhaust outlet is the combustion zone into which fuel is discharged under pressure from a main fuel supply line 12 via one or more fuel distributing means or nozzles 14. Located within the combustion zone and in communication with the main fuel supply line 12 is control device or housing 15. Control device 15 is fitted with an inlet 13 in the forward section thereof in the direction of the air inlet of shell 11. Extending rearwardly through control mechanism 15 is conduit 16 which may be of any suitable length and which is in communication at the other end with conduit means 19 and 20 (see Fig. 2). Concentrically enclosing conduit 18 and preferably an integral part of control device 15 is conduit means 20, which extends rearwardly and is outwardly flared at the rearward end thereof in the direction of outlet end of shell 11 into substantially a cup or a cone or any other suitable modification thereof or shape to form a shielded combustion zone within the combustion section of shell 11. This rearward outwardly flared portion of tube 20 is designated as flame holder 21.

Fig. 2 is a schematic representation of the invention and shows in detail an automatically controlled mechanism of the invention for maintaining a stable, controlled flame within flame holder 21 and the combustion zone of shell 11. Air inlet conduit 16 of the control device 15 communicates with valve body or cylinder 22 and depending upon the location of valve gate or plug 24 is in communication with air supply conduit 19 to the flame holder. With the valve gate or plug 24 in the position as shown valve plug 24 seals off conduit 16 from conduit 19 and fuel supply conduit 26 from conduit 18. Fuel supply conduit 18 terminates at orifice 31, the rearward end being within flame holder 21 and communicates at the forward end with valve body 22. Pressure responsive means 25 such as a bellows is in communication with fuel supply line 12 and is in contact with valve plug 24 and is adapted and positioned to move the valve plug in response to a change in pressure within means 25. A secondary fluid supply conduit 26 located within control device 15 is in communication with fuel supply line 12 and valve body 22. Located within valve body 22 and preferably an integral part of valve plug 24 is a substantially impermeable partition 28 intermediate between conduits 18 and 19 and conduits 16 and 26 and positioned such that fuel flow from line 26 only enters conduit 18 and positioned such that air flow from conduit 16 only enters conduit 19, all through valve body 22 within which partition 28 is located. For optimum performance a second pressure responsive means 29 may be provided at the other end of valve plug 24. This pressure responsive means may be a bellows and can be spring loaded. A pressure port 30 is provided in control device 15 to permit communication between the forward part of shell 11 and the interior of control device 15 and permitting the air pressure within the forward part of shell 11 to be exerted upon bellows 29. Bellows 29 as indicated above may be spring loaded or have a substantially different (greater) area than bellows 25.

Port 30 is provided in the shell of body 15 so as to permit the flow of air between the interior and exterior of that shell. Thus, air which enters combustion chamber 11 through the air inlet in the forward end is permitted to pass freely into the interior of body 15 through port 30. It will be noted, however, that port 30 is not in direct alignment with the air inlet in combustion chamber 11. On the other hand, inlet 13 in the forward end of body 15 is in alignment with the air inlet in combustion chamber 11 so that the flow of air directly through the air inlet in chamber 11 is directly into the air inlet in body member 15. Whether or not air is permitted to flow through inlet 13 and conduit 16 connected thereto is dependent upon whether or not plug 24 is in an elevated or depressed condition, considering the device from the position shown in Figure 2 of the drawing. When plug 24 is in elevated position, the impermeable partition 28 is positioned just below conduit 19 and plug 24 is positioned just above conduit 16 so that air entering through inlet conduit 13 is permitted to flow freely through conduit 16, a section of valve chamber 22, and out conduit 19 into a downstream portion of body member 15 through conduit 19. In other words, more air is supplied to the interior of body member 15 than would ordinarily be present when air is supplied to the interior of body 15 only by the equalizing flow of air through port 30. In this manner, a positive flow of air is obtained from conduit 19 through conduit 20 into the forward end of flame holder 21.

Referring to Figs. 1 and 2, air is admitted into shell 11 through the air inlet at a relatively high velocity. The velocity of the air through the inlet is reduced somewhat within the shell with a resulting increase in pressure. As the air passes the fuel supply nozzles 14 it is ignited by any suitable device together with fuel injected or added thereto from nozzles 14. Combustion takes place, resulting in a great increase in temperature and as a result the velocity of the combustion gases is very high. The hot combustion gases pass rearwardly through the combustion zone and through the thrust producing outlet at the rear end of shell 11. Inlet conduit 16 terminates at one end of outlet 13 in the forward section of control mechanism 15 and is preferably supplied with air from the forward section of shell 11 or from any other suitable source. Air is admitted into mechanism 15 via conduit 16 and is discharged via valve body 22 and conduit 19 through the interior of device 15 into conduit 20 and then into flame holder 21 wherein, as required, it is utilized to maintain a stable flame therein. When the fuel-air ratio is increased, other conditions remaining constant, i.e. when more fuel is forced into the combustion chamber via nozzles 14 as the fuel pressure is increased, valve plug 24 moves through valve body 22 under the action of expanding fuel bellows 25 admitting air from conduit 16 into conduit 19 and then into the flame holder. Also, when the fuel supply is reduced bellows 25 contracts so that air supply via line 16 is shut off, plug valve 24 moving through valve body 22 in the opposite direction due to contracting bellows 25 and whereupon a supply of fuel is admitted via line 26 from the main fuel supply line 12 or some other suitable source of fuel supply. Fuel from line 26 passes through valve 22 into conduit 18 leading to flame holder 21 into which the fuel is discharged. In the above-described operation the device of this invention depends primarily upon and is principally operated by the fuel pressure acting on bellows 25.

As shown, however the device of this invention can be adapted to function dependent also upon the pressure acting on bellows 25 and 29. If bellows 29 is larger than bellows 25 the total force acting on bellows 29 will always be greater than the total force acting on bellows 25. However the magnitude of the force differential between bellows 29 and 25 decreases proportionately as the air pressure within the forward part of shell 11 decreases. The response of bellows 29 to a change in pressure within device 15 can also be modified by providing the interior of bellows 29 with a suitable spring or coil.

In the operation of the control device as the amount of fuel to the new combustion zone is decreased, less pressure is exerted on bellows 25. As a result of the decrease in fuel flow to the combustion zone, bellows 25 tends to contract or pull or permit valve plug 24 to move through valve body 22 so as to open line 18 and to allow fuel to pass from line 26 through valve 22 into conduit 18. The fuel in line 18 is discharged via orifice 31 into the flame holder to maintain a flame therein and prevent flame blow-out at low thrust or low power requirements. When the fuel flow to the combustion zone is increased, more pressure is accordingly exerted on bellows 25, thereby expanding bellows 25 which serves to move valve plug 24 through valve body 22 thereby admitting only air via line 16 through or by valve 22 into conduit 19 and then into flame holder 21. However under certain conditions the device of my invention reaches and maintains the position as shown in Fig. 2, i.e. conduits 16 and 26 being blocked. Furthermore it is pointed out that the ambient air pressure acting upon bellows 29 and 25 also exerts a regulatory effect upon the position of valve plug 24 and thereby bellows 25 in combination with bellows 29 the device compensates for changes in fuel flow and air supply pressure simultaneously.

The amount of air admitted into the flame holder via the control mechanism when operating a ram jet at high thrust or power output (approaching rich blow-out limit) is usually small when compared to the total air flow through the jet engine. In operation however the amount of air admitted depends upon the design of the device, the size of the air inlet, the air speed, etc. A plurality of these devices may be employed in any one engine and at various locations therein. The amount of fuel supplied to any one flame holder of this invention is small when compared to the total fuel flow and is usually below about 5% by wt. By employing this invention in the operation of a ram jet engine it is possible to reduce the rich mixture blow-out limit by about 60% or more. Also it is possible by employing a device of this invention to extend the lean mixture blow-out limit by about 100% or more.

While the mechanism of the invention has been described with reference to Fig. 2 as having syphons or bellows, it is of course realized that any other suitable pressure-responsive device capable of movement under application of or release of pressure might also be employed. Furthermore although the invention has been described, as adapted to a ram jet engine it should be realized that the invention is not restricted thereto. Its employment in a ram jet engine is set forth in Fig. 1 merely as one embodiment of the invention and for purposes of clarity and ease of explanation since a ram jet is the simplest of all the various types of jet engines. However despite the basic simplicity of construction of a ram jet engine it is by far one of the most difficult to design for satisfactory and efficient operation.

It will be understood that once one skilled in the art has been taught the theory of operation of this invention and the results obtained thereby, such results may be obtained by various additions, modifications and rearrangements of parts other than these specifically set forth and enumerated herein. Hence no attempt has been made to describe all the advantageous features of this invention or all the modifications which may be made in order to carry out or produce such advantages and which do not depart from the spirit or scope of this invention.

I claim:

1. A burner having walls defining an elongated burner chamber provided with an open air inlet end, an open rearwardly extending discharge end, and a combustion zone intermediate thereof; valve means within said combustion zone; a tubular shield extending from said valve means in the direction of the discharge end of said burner; a fuel distributing conduit within said burner; a first conduit connecting said fuel distributing conduit and said valve means; a second conduit communicating with the air inlet of said burner and said valve means; a third conduit and a fourth conduit each communicating said valve means with said tubular shield; a valve plug within said valve means; an impermeable partition associated with said valve plug permitting communication between said first conduit and only said third conduit and between said second conduit and only said fourth conduit; pressure responsive means within said valve means and operatively connected to said valve plug; and a fifth conduit communicating said pressure responsive means with said fuel distributing conduit.

2. A burner according to claim 1 wherein the valve means and the tubular shield are located concentrically and axially within said burner.

3. A burner according to claim 1 wherein the pressure responsive means is a bellows.

4. The method of operating a jet engine to maintain stable combustion therein over a wide range of operating conditions which comprises supplying air to an auxiliary shielded combustion zone within the combustion section of said engine in response to an increase in a supply of fuel to the engine and supplying fuel to said shielded zone within said combustion section in response to a decrease in a supply of fuel to the engine.

5. The method of operating a jet engine to maintain stable combustion therein over a wide range of operating conditions which comprises; supplying air to an auxiliary shielded combustion zone within the combustion section of said engine in response to an increase in a supply of fuel to the engine.

6. The method of operating a jet engine to maintain stable combustion therein over a wide range of operating conditions which comprises; supplying fuel to an auxiliary shielded combustion zone within the combustion section of said engine in response to a decrease in a supply of fuel to the engine.

7. A burner comprising an elongated shell, open at its upstream and downstream ends; fuel supply means connected to the interior of said burner; a control chamber open in its downstream end and positioned in said burner; valve means intermediate the ends of said control chamber; air inlet means connected to said valve means; air outlet means extending from said valve means into said control chamber; fuel inlet means connected to said valve means; fuel outlet means extending from said valve means into the downstream end portion of said control chamber; and pressure responsive means operatively connected to said valve means so as to stop fuel flow and start air flow through said valve to the downstream end of said control chamber upon an increase of fuel pressure beyond a predetermined maximum and stop air flow and permit fuel flow through said valve to the downstream end of said control chamber upon a decreasee in fuel pressure below a predetermined minimum.

8. A burner comprising an elongated shell, open at its upstream and downstream ends; fuel supply means connected to the interior of said burner; a control chamber open in its downstream end and positioned in said burner; valve means in said burner; air inlet means connected to said valve means; air outlet means extending from said valve means into said control chamber; fuel inlet means connected to said valve means; fuel outlet means extending from said valve means into the downstream end portion of said control chamber; and pressure responsive means operatively connected to said valve means so as to stop fuel flow and start air flow through said valve to the downstream end of said control chamber upon an increase of fuel pressure beyond a predetermined maximum and stop air flow and permit fuel flow through said valve to the downstream end of said control chamber upon a decrease in fuel pressure below a predetermined minimum.

9. A method of operating a jet engine so as to maintain stable combustion therein over a wide range of operating conditions, and wherein the rate of introduction of fuel and air varies with changes in said operating conditions, which comprises: introducing air to a main combustion zone within the combustion section of said engine; introducing fuel into said main combustion zone; igniting the resulting fuel-air mixture; supplying air to an auxiliary shielded combustion zone within said combustion section in response to an increase in the introduction of said fuel to said main combustion zone; and supplying fuel to said shielded combustion zone in response to a decrease in the introduction of said fuel to said main combustion zone.

10. A method of operating a jet engine so as to maintain stable combustion therein over a wide range of operating conditions, and wherein the rate of introduction of fuel and air varies with changes in said operating conditions, which comprises: introducing air to a main combustion zone within the combustion section of said engine; introducing fuel into said main combustion zone; igniting the resulting fuel-air mixture; and supplying air to an auxiliary shielded combustion zone within said combustion section in response to an increase in the introduction of said fuel to said main combustion zone.

11. A method of operating a jet engine so as to maintain stable combustion therein over a wide range of operating conditions, and wherein the rate of introduction of fuel and air varies with changes in said operating conditions, which comprises: introducing air to a main combustion zone within the combustion section of said engine; introducing fuel into said main combustion zone; igniting the resulting fuel-air mixture; and supplying fuel to an auxiliary shielded combustion zone within said combustion section in response to a decrease in the introduction of said fuel to said main combustion zone.

References Cited in the file of this patent

UNITED STATES PATENTS

| | | |
|---|---|---|
| 2,227,666 | Noack | Jan. 7, 1941 |
| 2,457,157 | King | Dec. 28, 1948 |
| 2,565,308 | Hottel et al. | Aug. 21, 1951 |
| 2,644,299 | Williams | July 7, 1953 |
| 2,655,787 | Brown | Oct. 20, 1953 |
| 2,697,910 | Brzozowski | Dec. 28, 1954 |